(12) United States Patent
Denninger et al.

(10) Patent No.: US 7,604,694 B2
(45) Date of Patent: Oct. 20, 2009

(54) MARKING LIQUID

(75) Inventors: Hanns Dieter Denninger, Nürnberg (DE); Thomas Spengler, Kalchreuth (DE); Ivan Horvat, Weissenburg (DE); Klaus Dieter Schröder, Nürnberg (DE)

(73) Assignee: Schwan-STABILO Schwanhausser GmbH & Co. KG, Heroldsberg (DE)

( * ) Notice: Subject to any disclaimer, the term of this patent is extended or adjusted under 35 U.S.C. 154(b) by 0 days.

(21) Appl. No.: 11/960,787

(22) Filed: Dec. 20, 2007

(65) Prior Publication Data

US 2008/0097006 A1    Apr. 24, 2008

Related U.S. Application Data

(63) Continuation of application No. 10/333,835, filed on Oct. 13, 2003, now Pat. No. 7,365,107.

(30) Foreign Application Priority Data

| Jan. 30, 2001 | (DE) | ................. | 101 03 982 |
| Jul. 20, 2001 | (DE) | ................. | 101 35 530 |
| Sep. 19, 2001 | (DE) | ................. | 101 46 187 |
| Sep. 19, 2001 | (DE) | ................. | 101 46 188 |
| Jan. 29, 2002 | (WO) | ................. | PCT/EP02/00910 |

(51) Int. Cl.
*C09D 11/00* (2006.01)
*C09D 11/10* (2006.01)
*C09D 11/20* (2006.01)

(52) U.S. Cl. .............. 106/31.64; 106/31.13; 106/31.15; 106/31.32; 106/31.6; 523/160; 523/161

(58) Field of Classification Search ................ 523/160, 523/161; 106/31.13, 31.15, 31.32, 31.6, 106/31.64

See application file for complete search history.

(56) References Cited

U.S. PATENT DOCUMENTS

| 4,792,357 | A | * | 12/1988 | Bier ........................ 106/600 |
| 5,294,664 | A | * | 3/1994 | Morrison et al. ............ 524/560 |
| 6,031,019 | A | * | 2/2000 | Tsutsumi et al. ............ 523/160 |
| 6,632,510 | B1 | * | 10/2003 | Waller et al. ............. 428/195.1 |

* cited by examiner

*Primary Examiner*—Sanza L McClendon
(74) *Attorney, Agent, or Firm*—Bachman & LaPointe, P.C.

(57) ABSTRACT

A marking liquid which contains a polymer dispersion with particles which are colored with marking agent, optionally further dyes and marking agents, one or more salts of a polyvalent, in particular bi- or trivalent cation, water and optionally moisture retaining agents and further usual additives, wherein the polymer forming the polymer particles is selected from the group of polyesters, polyester amides, polymers and copolymers based on acrylate or methacrylate with a proportion of free carboxylic acid groups of less than 10% by weight, melamine-formaldehyde-sulfonamide resins and mixtures thereof.

17 Claims, No Drawings

MARKING LIQUID

CROSS REFERENCE TO RELATED APPLICATIONS

This application is a continuation application of U.S. Ser. No. 10/333,835 filed Oct. 13, 2003.

The invention concerns a marking liquid and the use thereof.

Marking liquids are used to emphasise texts or pieces of text by their bright color. In that respect the marking liquid is usually delivered by an applicator or writing implement with a suitably shaped tip. Usually marking liquids contain daylight colors or fluorescent dyes or coloring agents which produce the luminous effect on the surface of a writing substrate, for example a piece of paper. In that case, when being passed over the written text, the marking liquid should admittedly emphasise same but it should not alter it and in particular it should neither smudge it or color it.

Now problems arise when using water-based marking liquids in order to mark texts which are printed out by an ink jet printer.

Ink jet printers are wide-spread—and likewise marking of texts and pieces of text with fluorescent inks with text markers and highlighters. The inks which are used for ink jet printing are mostly based on aqueous liquids and are either solutions of water-soluble dyes or aqueous dispersions of pigments or colored polymer particles which are also referred to as pigmented inks. The pigmented inks are becoming more and more generally accepted because they have better light-fastness than those which are mostly produced using water-soluble dyes, and in addition they permit finer printing with a higher degree of resolution. Dye-based inks admittedly penetrate more deeply into the paper used and more intensively color the fibers and thereby also adhere better, but they suffer from the disadvantage of a lower level of light-fastness and in addition can be erased or altered in color with so-called ink killers, mostly solutions of reducing agent and/or acids.

In regard to pigmented ink jet printing ink the pigments used for printing are dispersed therein, with stabilisers, which in the printing operation remain behind on the paper after drying in the form of a film. If now an aqueous liquid comes into contact with the dried text the aqueous medium at least begins to dissolve the layer stabilising the pigment, whereby the pigment particles can be displaced. As a result the text is blurred or smeared. That drying process lasts for quite a few seconds to several minutes, during which the printed image is particularly sensitive. The same problems can also occur in regard to a text which was printed out with a pigmented ink based on polymer particles.

Water-soluble or water-dispersible polymers or finely divided polymer dispersions are very frequently used for pigmented jet printing inks. They are often homopolymers or copolymers based on acrylate, methacrylate and styrene, as well as copolymers based on styrene and acrylonitrile. Those polymer dispersions generally have a basic or quite weakly acid pH-value. The stabilisers are therefore also dissolved again or subjected to initial dissolution by aqueous basic or quite weakly acid solutions and also neutral water.

The marking agents used in so-called text markers or highlighters are usually aqueous compositions of a fluorescent dye or daylight dye which are often at least weakly basic. Pyranine (C.I. Solvent Green 7, No 59.040), a frequently employed dye with strongly yellow fluorescence, fluoresces for example most strongly in an alkaline range of pH between 8 and 12, in particular at a pH of between 8 and 10. U.S. Pat. No. 6,169,185 also discloses the use of polyester dispersions for the production of fluorescent jet printing inks which must satisfy particular properties in order to be suitable for jet printing.

If therefore a text which has been printed by an ink jet printer with pigmented or pigment-bearing ink is covered with a marker containing an alkaline marking liquid, the stabiliser of the ink experiences incipient dissolution again, even after the ink is completely dried, and that results in smearing of the text due to displacement of the pigment particles. Such a text reacts in a quite particularly sensitive fashion towards the end of or immediately after the drying phase. That problem also occurs when distilled water is used for the production of the marking liquid and the pH-value is approximately neutral.

One way of resolving the problem, which appears to be appropriate, involves setting the marking liquid in the acid range as then the stabiliser, even if it experiences incipient dissolution by the aqueous medium, could be immediately precipitated again. The addition of acid however has not proven to be suitable in a practical context as on the one hand dyes frequently react to changes in the pH-value by color changes and on the other hand the addition of acids unstabilises the marking liquid itself. Marking liquids which contain pyranine do not exhibit any fluorescence when set to be acid and would thus be unsuitable for the intended purpose of use. However even marking liquids with a pH-value in the weakly acid range do not afford any improvement in the situation as their acidity is lower than the basicity of the stabilisers in the ink jet printing inks and therefore they cannot nonetheless be spontaneously precipitated on the paper in the coating operation.

Persuading the manufacturers of ink jet printing inks to adapt their products to the conditions of the marking inks is also not a viable proposition.

EP-A 0 761 783 describes a recording medium for a jet printer in which the dispersed pigment is precipitated by the addition of a salt. The salt however can only be added directly in the printing operation as otherwise the dispersion is unstable.

It is also known from WO 00/71629 that a transparent application of color can be rendered opaque by the use of salts, in particular alkali metal salts.

Therefore the object of the invention was to provide a marking liquid which, even when being applied over text printed with ink jet printing ink, in particular with pigmented ink, does not blur or smear same and in particular can precipitate the stabiliser contained in the ink jet printing ink, the marking liquid at the same time retaining its stability.

That object is attained by a marking liquid which contains a polymer dispersion with particles which are colored with marking agent, optionally further dyes and marking agents, one or more salts of a polyvalent, in particular bi- or trivalent cation, water and optionally moisture retaining agents and further usual additives, wherein the polymer forming the polymer particles is selected from the group of polyesters, polyester amides, polymers and copolymers based on acrylate or methacrylate, melamine-formaldehyde-sulfonamide resins and mixtures thereof.

Surprisingly it was found that the use of a polymer dispersion containing polymer particles loaded with marking agent, wherein the polymers are selected from those set forth hereinbefore, in combination with salts based on polyvalent cations in aqueous medium, gives a stable marking liquid which, when being applied over text printed with pigmented ink jet ink or text written with pigmented ink, does not adversely affect same.

Moreover the addition, in accordance with the invention, of salts of polyvalent cations, even in prolonged storage, with fluctuating temperatures of between −20° C. and +50° C.—temperatures as can certainly occur in transport situations in our climatic zones—does not result in any disadvantageous rheological changes or separation phenomena, deflocculation phenomena, coagulation or the like.

The core of the invention is therefore the combination of special polymer particles as carriers or stabilisers for the marking agent in combination with salts based on polyvalent, in particular bi- or trivalent cations. That combination affords on the one hand a stable marking liquid and on the other hand, when applied over printed or written text, in spite of an aqueous solvent, does not result in smearing thereof. It is even possible with the marking liquid according to the invention for documents to already be marked directly after printing without the text being blurred. That was not possible with the previously known text markers and highlighters.

The one essential constituent of the marking liquid according to the invention is polymer particles which are colored or charged with fluorescent dyes or daylight dyes. Many fluorescent and luminescent dyes and luminous colors are known, which radiate in the most widely varying colors. All those known dyes which are usually employed in markers and highlighters are suitable here. They are referred to hereinafter as 'marking agent'. The marking agents are generally used by polymer particles of the defined kind being loaded therewith. Such loaded polymer particles are commercially available in the form of aqueous colored dispersions. They are usually produced by polymerisation and coloring being effected in situ. Inks of different coloration can be obtained by simply mixing and diluting commercially available concentrates. Thus, yellow, blue or red fluorescent polymer dispersions are available, the mixing of which then gives further color shades.

The polymer used in accordance with the invention for the polymer dispersion is selected from the group consisting of polyesters, polyester amides, polymers and copolymers based on acrylate or methacrylate, melamine-formaldehyde-sulfonamide resins or mixtures thereof. It was found that those selected polymers are suitable for the production of stable marking inks. Mixtures of those polymers are also suitable, in which respect it is possible to use both mixtures of polymers of one kind of polymer and also mixtures of polymers of different ones of the stated kinds of polymer. In particular mixtures of polymer dispersions are considered for producing preparations of a desired color shade by mixing.

Among the group of polyesters, consideration is given inter alia to those polyesters which are made up of dibasic or polybasic carboxylic acid monomers and bivalent or polyvalent alcohols. The carboxylic acid monomers considered are in particular straight-chain, branched or alicyclic monomers with two carboxyl groups, preferably those with between one and eight and in particular between two and six carbon atoms or reactive derivatives thereof. Suitable carboxylic acid monomers are for example cyclohexane dicarboxylic acid, in particular 1,4- and 1,2-cyclohexane dicarboxylic acid, as well as adipic acid and succinic acid and anhydrides thereof.

The alcohols used are bivalent or polyvalent straight-chain, branched or alicyclic alcohols with between one and ten, preferably between two and eight carbon atoms. Examples are cyclohexane dimethanol, neopentylglycol, ethylene glycol, propylene glycol or 2-methylpropane-1,3-diol. Besides the specified carboxylic acid units and alcohol units the polyester may contain further monofunctional monomers which are used in particular for chain breaking. Examples in that respect are methanol, ethanol and propanol.

The polyester is more suitably polymerised in the presence of the marking agent so that the marking agent colors the particles and remains adhering thereto and does not migrate into the liquid phase. Dispersions of such polyesters which are colored with marking agent and which are considered for the marking liquid according to the invention as the carrier of the dye or the marking agent are commercially available and the production thereof does not need to be described in greater detail here. Examples of suitable polyesters and colored dispersions produced therewith are to be found for example in U.S. Pat. No. 6,169,185 to which reference is made here. In addition suitable dispersions are offered and sold for example by Mikuni, Sinloihi and Day-Glo Color Corporation. Inks of various coloration can be produced in per se known manner by simply mixing and diluting commercially available concentrates. Usual additives which are described hereinafter can then also be added to those mixtures.

A further polymer which is used in accordance with the invention and which can be charged with fluorescent dyes is polyesteramide resin. That involves polyesteramide resin colored with fluorescent dyes, so-called daylight dyes, in aqueous dispersion. Such colored polymers are not referred to in the Colour Index and therefore it is not possible to provide for a corresponding attribution here. They are commercially available and are sold for example by SWADA (London) Ltd under the trade name 'Fiesta'. These involve finely divided powders of different colors, which are dispersed in water with the addition of a stabilising agent, for example hydroxyethyl cellulose or sodium alginate and are then ground by means of a ball mill or a similar grinding apparatus to a definitive particle size in the range of between 50 and 500 nm. Preferably colored 'stock dispersions' with a polymer content of between 30 and 40% by weight are subjected to further processing.

Colored polyesteramide resin particles are commercially available in the form of polymer powder in the most widely varying colors with fluorescent dyes, so-called daylight colors, inter alia from SWADA (London) Ltd, so that, after suitable preparation, as stated above, the man skilled in the art has at his disposal a wide palette of differently colored polymer dispersions based on polyesteramide resins which he can directly subject to further processing or mix together and then subject to further processing.

When processing polyesteramide resin dispersions, care is to be taken to ensure that the dispersing, mixing and crushing operations are effected substantially at ambient temperature and that as far as possible a temperature of 40° C. is not exceeded. If necessary cooling should be effected during the crushing operation. In addition, when using polyesteramide resins the pH-value of the aqueous mixture should be monitored and possibly set by the addition of dilute mineral acid, for example hydrochloric acid or dilute carboxylic acid, for example acetic acid or citric acid, to a value of between 5 and 7, preferably between 5.6 and 6.3.

The above-mentioned commercially available polyesteramide powders, when observing the specified boundary conditions, are very easy to process to afford aqueous polymer dispersions and to be later easily subjected to further processing to afford marking agents of the appropriate color. In principle however it is also possible to produce polyesteramide particles by way of dispersion polymerisation and to subsequently dye them with suitable dyeing agents. In that case a part of the dyeing agents can remain in the aqueous solution. Marking agents produced in that way frequently have less coloring power and are less light-resistant. It is then also possible to add to the marking agents obtained in that way usual additives with which the man skilled in the art is familiar such as surface-active substances, moisture-retaining agents, pH-stabilisers, preserving agents and so forth.

When processing polyesteramide resin dispersions, care is to be taken to ensure that the dispersing, mixing and crushing operations are effected substantially at ambient temperature and that as far as possible a temperature of 40° C. is not exceeded. If necessary cooling should be effected during the crushing operation. In addition, when using polyesteramide resins the pH-value of the aqueous mixture should be monitored and possibly set by the addition of dilute mineral acid, for example hydrochloric acid or dilute carboxylic acid, for example acetic acid or citric acid, to a value of between 5 and 7, preferably between 5.6 and 6.3.

The above-mentioned commercially available resin dispersions, when observing the specified boundary conditions, are also very easy to process to afford aqueous polymer dispersions and to be later easily subjected to further processing to afford marking agents of the appropriate color. In principle however it is also possible to produce polymer particles by way of polycondensation and to subsequently dye them with suitable dyeing agents. In that case a part of the dyeing agents can remain in the aqueous solution. Marking agents produced in that way frequently have less coloring power and are less light-resistant. It is then also possible to add to the marking agents obtained in that way usual additives with which the man skilled in the art is familiar such as surface-active substances, moisture-retaining agents, pH-stabilisers, preserving agents and so forth.

To produce the preparation according to the invention it is also possible to use a polymer dispersion with polymer particles based on homo- or copolymers of acrylate or methacrylate, which have no or only small proportions of free carboxylic acid groups, as the carrier or stabiliser, wherein the proportion of free carboxylic acid groups is less than 10% by weight, preferably less than 5% by weight, with respect to the dry substance of polymer.

To produce the preparation according to the invention the above-defined polymer particles based on homo- or copolymers of acrylate or methacrylate are charged with fluorescent or luminescent dyes or luminous colors. All the known, above-described marking agents are suitable. Colored dispersions of such polymer particles are also commercially available, for example from MIKUNI, Japan, under trade names such as for example 'Victoria Yellow', or DAYGLO, USA, under trade names such as 'Saturn Yellow ECX'.

Those products involve for example colored dispersions of methacrylonitrile/methacrylic acid copolymer or glycidylmethacrylate/methylmethacrylate/styrene copolymer or mixtures of the two dispersions of polymer particles.

They are produced for example by polymerisation and coloring being effected in situ by way of dispersion polymerisation. Inks of different coloration can be obtained by simply mixing and diluting commercially available concentrates. Thus yellow, red or blue polymer dispersions based on homo- or copolymers of acrylate or methacrylate, which have no or only a small proportion of free carboxylic acid groups, wherein the proportion of free carboxylic acid groups is less than 10% by weight, preferably less than 5% by weight, with respect to the dry substance, is available as polymer, the mixing of which gives further color shades. In principle however it is also possible to produce polymer particles by way of dispersion polymerisation and to subsequently dye them with suitable dyeing agents with the problems as described hereinbefore in respect of polyesteramides.

To produce the preparation according to the invention it is also possible to use a colored melamine-formaldehyde-sulfonamide resin in an aqueous dispersion. Such colored polymers are not specified in the Colour Index and therefore it is also not possible to afford a corresponding attribution here. They are commercially available and are sold for example by SWADA (London) Ltd under the trade name 'Fiesta'. This involves finely divided aqueous dispersions in different colors, which desirably prior to further processing to form marking liquids are crushed once again by means of a ball mill or similar crushing apparatus to a particle size in the range of between 50 and 500 nm.

Colored polymer particles of melamine-formaldehyde-sulfonamide resin are commercially available as polymer powders in the most widely varying colors with fluorescent dyes, so-called daylight colors, inter alia from SWADA (London) Ltd, so that the man skilled in the art, after suitable preparation, as described above, has at his disposal a wide palette of differently colored polymer dispersions based on those resins, which he can directly subject to further processing or mix with each other and then subject them to further processing.

The further essential constituent of the marking liquid according to the invention is a salt based on a polyvalent cation, in particular a bi- or trivalent cation. It is also possible to use mixtures of salts of various, in particular polyvalent cations. Salts of tetravalent cations are also suitable if they are stable in aqueous solution, alone or in combination with further salts based on bi- and/or trivalent cations. In that case salt formation can also be effected in situ, by neutralisation of a suitable base with an acid or by reaction of a metal oxide with a salt. Preferably in that respect use is made of such salts which have as little influence as possible on the color of the marking liquid by virtue of their own color in aqueous solution. Salts of the common monovalent cations such as sodium, potassium and ammonium have been found not to be appropriate.

Salts of bi- and/or trivalent cations have been found to be particularly suitable, in particular those which are derived from magnesium, calcium, zinc, tin, cobalt, iron (II), iron (III), aluminum and titanium.

The anion used as the opposed ion is not critical and can be for example the anion of an inorganic or organic acid, for example a halogen acid such as hydrochloric acid, sulfuric acid or nitric acid and a mono- or polyvalent carboxylic acid, in particular with between one and ten carbon atoms. Particularly preferred anions are chloride, nitrate, sulfate, acetate, citrate and propionate. Borate and phosphates are also suitable. Particularly good results were achieved with magnesium chloride, calcium chloride, zinc chloride, zinc acetate, zinc nitrate, tin chloride, iron (II) sulfate, iron (III) chloride, aluminum chloride, aluminum acetate, aluminum hydroxide acetate, titanium (IV) chloride and others.

The choice of the salt of a polyvalent cation is also made inter alia having regard to the desired color of the marking liquid. Some of the salts, in particular of iron, cobalt and titanium, have when dissolved a strong inherent color and therefore can only be used for marking liquids which are also strongly colored.

The total amount of the salt is in a range up to saturation of the solution and preferably between 0.3 and 10% by weight, particularly preferably between 1 and 10% by weight. Under 0.3% by weight the action is no longer adequate while more than 10% by weight no longer affords any further improvement in the properties. In a particularly preferred feature the amount used is between 0.8 and 7% by weight and especially for polyester between 2 and 8% by weight, in particular between 1.2 and 5% by weight, especially for polyester between 3 and 6% by weight. The percentages by weight each relate in that respect to the total amount of the marking liquid.

Besides the colored polymer particle or particles and the salt or salts of polyvalent cations the marking liquid according to the invention may also contain further ingredients which are usual for such marking liquids.

The base medium of the marking liquid according to the invention is aqueous so that water forms the major part of the liquid. Water-soluble solvents may optionally also be contained in a relatively small proportion, if that appears appropriate.

In particular moisture retaining agents or drying retardants can be considered as additives. The agents which are usually employed for marking agents are to be referred to here. Particularly suitable are glycerine, diglycerine, triglycerine, diglycol, propylene glycol, dipropylene glycol, butylene glycols, hexylene glycols, diethylene glycol, triethylene glycol, sorbitol, mannitol, xylitol, glucose, fructose, saccharose, urea and further commercially available products. The moisture retaining agents are used in the amounts which are usually employed, preferably in a proportion of between 3 and 15% by weight.

The marking liquid according to the invention can be used in per se known manner for the production of text markers and highlighters. The markers produced therewith are particularly suitable for text marking of texts which are written or printed with water-soluble ink.

A further subject of the invention is therefore the use of the marking liquid for the production of marking pens, in particular those for marking texts written or printed with pigmented or pigment-bearing ink.

The invention is further described by the following examples without being limited thereto. The amounts specified in the examples are each given in percent by weight with respect to the total amount of the marking liquid. Usual international free names of the INCI nomenclature (INCI=International Cosmetic Ingredient Dictionary and Handbook) are used to designate the non-ionic surfactants used.

EXAMPLE 1

Marking Liquid, Fluorescing Yellow

| | |
|---|---|
| Polyester dispersion, fluorescing yellow | 70.000 |
| Zinc chloride | 5.000 |
| Glycerine | 5.000 |
| Water, demineralised | 20.000 |

For production purposes the polyester dispersion is provided in a suitable container and diluted with water, thereafter the glycerine is slowly added and then the zinc chloride is added slowly with agitation and further agitation is effected for 15 minutes.

EXAMPLE 2

Marking Liquid, Fluorescing Red

| | |
|---|---|
| Polyester dispersion, fluorescing red | 70.000 |
| Aluminum chloride | 4.000 |
| Sorbitol, 70% by weight in water | 8.000 |
| Water, demineralised | 18.000 |

Production is effected similarly to Example 1.

EXAMPLE 3

Marking Liquid, Fluorescing Orange

| | |
|---|---|
| Polyester dispersion, fluorescing red | 25.000 |
| Polyester dispersion, fluorescing yellow | 45.000 |
| Magnesium chloride | 2.500 |
| Aluminum chloride | 1.500 |
| Sucrose (cane sugar) | 4.500 |
| Water | 21.500 |

Production is effected similarly to Example 1.

EXAMPLE 4

Marking Liquid, Green

| | |
|---|---|
| Polyester dispersion, fluorescing yellow | 41.000 |
| Polyester dispersion, blue | 29.000 |
| Aluminum hydroxide acetate | 2.000 |
| Calcium chloride | 3.500 |
| Triglycerine | 5.500 |
| Water, demineralised | 19.000 |

Production is effected similarly to Example 1.

Suitable preserving agents can possibly also be added to the finished mixtures. Odor-sensitive persons may possibly be troubled by the slight vinegary smell of products based on acetates. The chlorides are therefore preferred.

It is recommended that the finished compositions are filtered through a cloth in order to separate off any solid bodies. The inks obtained are directly suitable for filling into marker implements and can be subjected to further processing in the usual way. They are distinguished by low viscosity and excellent luminous power and can also be well used on fresh printing from ink jet printers or on fresh handwritten notes.

EXAMPLE 5

Marking Liquid, Fluorescing Yellow

| | |
|---|---|
| Saturn Yellow ECX 17 (DAYGLO) | 25.000 |
| Zinc oxide, water-free | 2.000 |
| 80% (V/V) acetic acid | 5.000 |
| Diethylene glycol | 10.000 |
| Preserving agent | 0.150 |
| Water, demineralised | 57.850 |

For production purposes the zinc oxide is dissolved in the acetic acid, in which case slight heating possibly has to be effected. The dispersion of Saturn Yellow ECX 17 is provided in a suitable container and diluted with the same amount of water with slight agitation with a propeller agitator. Thereafter the diethylene glycol and the preserving agent are added. The resulting solution of zinc acetate is diluted with the remaining amount of demineralised water and slowly added to the preparation. Agitation is subsequently effected for a further 30 minutes, the pH-value is possibly adjusted to between 5.3 and 5.6 and the preparation is then filtered through a cloth. That gives a yellow opaque marking liquid with strong yellow fluorescence.

EXAMPLE 6

Marking Liquid, Fluorescing Blue

| Victoria Blue G 25 (MIKUNI) | 25.000 |
| Zinc chloride, water-free | 8.000 |
| 1,2-Propylene glycol | 20.000 |
| Preserving agent | 0.150 |
| Water, demineralised | 46.850 |

For production purposes the zinc oxide is dissolved in a partial amount of water. The dispersion of Victoria Blue G 25 is provided in a suitable vessel and agitated with slight agitation with a propeller agitator. The remaining water is then added. The 1,2-propylene glycol and the preserving agent are then added and the solution of zinc chloride is then slowly metered into the preparation. The pH-value is adjusted with acetic acid to between 5.3 and 5.6 and the preparation is filtered through a cloth. The result obtained is a luminous blue opaque marking liquid which on paper exhibits attractive blue fluorescence.

EXAMPLE 7

Marking Liquid, Fluorescing Red

| Rocket Red ECX 13 (DAYGLO) | 30.000 |
| Zinc chloride, water-free | 3.000 |
| 1,2-Propylene glycol | 15.000 |
| Preserving agent | 0.150 |
| Water, demineralised | 51.850 |

Production is effected similarly to Example 6. The result obtained is a fluorescing red opaque marking liquid with strong red fluorescence.

EXAMPLE 8

Marking Liquid, Fluorescing Green

| Saturn Yellow ECX 17 (DAYGLO) | 30.000 |
| C.I. Acid Blue 9 (No 42090) | 0.300 |
| Zinc chloride, water-free | 5.000 |
| 1,2-Propylene glycol | 15.000 |
| Preserving agent | 0.150 |
| Water, demineralised | 49.550 |

Production is effected similarly to Example 6.

Still further suitable preserving agents can optionally be added to the finished mixtures and the pH-values can be adjusted by the addition of acids or lyes, to the desired value. It is also possible to add buffer substances for stabilisation of the desired pH-value.

It is recommended that the preparations be filtered, for example through a cloth, in order to separate off any solids. The inks produced are directly suitable for filling in marker implements such as text markers or highlighters and can be subjected to further processing in the usual manner. They are distinguished by low viscosity and excellent luminous power and can also be well used on fresh printing of ink jet printers or on fresh handwritten notes.

EXAMPLE 9

Production of an Aqueous Pigment Dispersion

| Fiesta Solar Yellow NFS-7 | 40.000 |
| Sodium alginate solution (5% by weight) | 10.000 |
| Preserving agent | 0.150 |
| Ceteareth-20 | 2.000 |
| Water, demineralised | 47.850 |

The Ceteareth-20 (non-ionic surfactant) is dissolved in a separate vessel in about ten times the amount of water; slight heating is possibly to be effected. The remaining amount of water is provided in a suitable container, then the separately produced sodium alginate solution is added and preserving agent and the surfactant solution added. Then the pigment powder is slowly added by sprinkling with agitation with a high-speed agitator, for example a toothed disk, at about 1500 rpm, and the mixture is agitated at ambient temperature until a homogeneous dispersion is produced. The dispersion is then passed at least twice through a ball mill, for example FRYMA or NETZSCH, until the desired particle size in the range of between 50 nm and 500 nm is reached. The result obtained is a yellow-fluorescent solution. That 'stock dispersion' is adjusted with dilute hydrochloric acid or citric acid solution (or another suitable mineral acid or carboxylic acid) to a pH-value of between 5 and 7, preferably between 5.5 and 6.5, and processed to form marking liquids, as described hereinafter.

In a similar manner further 'stock dispersions' for the production of marking liquids can be produced from Fiesta Laser Red (red fluorescence), Fiesta Stellar Green NFS-8 (green fluorescence), Fiesta Margenta NFS-10 (red-violet fluorescence), Fiesta Comet Blue NFS-60 (blue fluorescence) or Fiesta Astral Pink NFS-1 (pale pink). It is essential in that respect that the temperature of the mixture during the processing procedure does not rise above 40° C. because then the fluorescence of the mixtures suffers.

EXAMPLE 10

Marking Liquid, Fluorescing Yellow

| Fiesta Solar Yellow NFS-7 (40% by weight) | 45.000 |
| Zinc acetate | 3.000 |
| 1,2-Propylene glycol | 10.000 |
| Ceteareth-20 | 2.000 |
| Preserving agent | 0.150 |
| Water, demineralised | 39.850 |

The zinc acetate is dissolved in a separate vessel in a sufficient amount (solution 1). The Ceteareth-20 is dissolved in a separate vessel in the remaining amount of water and then preserving agent and 1,2-propylene glycol added (solution 2). The 'stock dispersion' is provided in a suitable vessel. The solution 2 is now added with slight agitation with a propeller agitator and agitated for 5 minutes. Thereafter the solution 1 is added with somewhat more vigorous agitation. Agitation is continued for a further 30 minutes, the pH-value is adjusted to between 5.3 and 5.6 and the preparation is then filtered through a cloth. The result obtained is a yellow opaque marking liquid involving strong yellow fluorescence and excellent light-stability, which can be used in the usual manner for the production of marker devices.

EXAMPLE 11

Marking Liquid, Fluorescing Blue

| | |
|---|---:|
| Fiesta Comet Blue NFS-60 (40% by weight) | 16.000 |
| Zinc chloride, water-free | 4.500 |
| 1,2-Propylene glycol | 10.000 |
| Ceteareth-20 | 2.000 |
| Preserving agent | 0.150 |
| Water, demineralised | 67.350 |

Production is effected similarly to Example 10. The result obtained is a blue marking liquid involving weakly blue fluorescence and very good light-stability.

EXAMPLE 12

Marking Liquid, Fluorescing Red

| | |
|---|---:|
| Fiesta Laser Red NFS-3 (40% by weight) | 50.000 |
| Zinc oxide, water-free | 3.000 |
| Acetic acid (80% V/V) | 6.500 |
| 1,2-Propylene glycol | 12.500 |
| Ceteareth-20 | 2.000 |
| Preserving agent | 0.150 |
| Water, demineralised | 25.850 |

For production purposes the zinc oxide is dissolved in the acetic acid, in which respect the acetic acid was previously diluted approximately 1:1 with water. Production is otherwise effected similarly to Example 10. The result obtained is a luminously red opaque marking liquid with strong red fluorescence and excellent light-stability. Besides use in marking implements this color is also well suited as an effect color in fiber-tip pens with a thin applicator tip (so-called 'neon pens').

EXAMPLE 13

Marking Liquid, Fluorescing Green

| | |
|---|---:|
| Fiesta Solar Yellow NFS-7 (40% by weight) | 35.000 |
| C.I. Acid Blue 9 (No 42090) | 0.300 |
| Zinc chloride, water-free | 3.500 |
| 1,2-Propylene glycol | 12.000 |
| Pareth-25-12 | 2.000 |
| Preserving agent | 0.150 |
| Water, demineralised | 47.050 |

Production is effected similarly to Example 10, wherein firstly the dye C.I. Acid Blue 9 which is easily soluble in water is added to the composition before the addition of solutions 1 and 2. Thereafter the further procedure is as described in Example 10. The result is an opaque marking liquid with marked green fluorescence and good light-stability.

EXAMPLE 14

Marking Liquid, Fluorescing Green

| | |
|---|---:|
| Fiesta Solar Yellow NFS-7 (40% by weight) | 37.500 |
| Fiesta Comet Blue NFS-60 (40% by weight) | 12.500 |
| Magnesium sulfate | 4.000 |
| 1,3-Butylene glycol | 13.500 |
| Ceteareth-20 | 2.000 |
| Preserving agent | 0.150 |
| Water, demineralised | 30.350 |

Production is effected similarly to Example 10. The result obtained is an opaque green marking liquid with yellow-green fluorescence and very good light-stability.

EXAMPLE 15

Marking Liquid, Fluorescing Orange

| | |
|---|---:|
| Fiesta Solar Yellow NFS-7 (40% by weight) | 30.000 |
| Fiesta Laser Red NFS-3 (40% by weight) | 20.000 |
| Zinc acetate | 3.500 |
| Saccharose | 10.000 |
| Oleth-25 | 2.000 |
| Preserving agent | 0.150 |
| Water, demineralised | 34.350 |

Production is effected similarly to Example 10. The result obtained is an opaque dispersion with very attractive orange fluorescence and excellent light-stability. Besides use in marking implements this color is also particularly suitable for so-called 'neon pens'.

EXAMPLE 16

Marking Liquid, Fluorescing Pink

| | |
|---|---:|
| Fiesta Astral Pink NFS-1 (40% by weight) | 35.000 |
| Magnesium sulfate | 3.000 |
| Sorbitol (70% by weight) | 10.000 |
| Pareth-25-12 | 2.000 |
| Preserving agent | 0.150 |
| Water, demineralised | 49.850 |

Production is effected similarly to Example 10. The result obtained is a pale pink colored, opaque marking liquid with bright red fluorescence and good light-stability. It is also well suitable for so-called 'neon pens'.

Still further suitable preserving agents can optionally be added to the finished mixtures and the pH-values can be adjusted to the desired value by the addition of acids or lyes. It is also possible to add buffer substances for stabilisation of the desired pH-value.

It is recommended that the preparations be filtered, for example through a cloth, in order to separate off any solids. The inks obtained are directly suitable for filling into marker implements such as text markers or highlighters and can be subjected to further processing in the usual way. They are distinguished by low viscosity and excellent luminous power and can also be well used on fresh printing from ink jet printers or on fresh handwritten notes.

EXAMPLE 17

Marking Liquid, Fluorescing Yellow

| | |
|---|---|
| Fiesta Solar Yellow T-7 | 30.000 |
| Zinc acetate | 3.000 |
| 1,2-Propylene glycol | 10.000 |
| Ceteareth-20 | 2.000 |
| Preserving agent | 0.150 |
| Water, demineralised | 54.850 |

The Ceteareth-20 is dissolved in about 10 parts of water with heating and added with agitation to the dye dispersion. Thereafter that mixture is passed at least twice through an agitator device ball mill FRYMA or NETZSCH system, transferred into a suitable vessel and the mean particle size ascertained. In a separate vessel the zinc acetate is dissolved in about 10 parts of water. The preserving agent and the 1,2-propylene glycol are now slowly added to the preparation with agitation with a toothed disk. Thereafter the solution of zinc acetate is slowly poured in. Agitation is continued for a further 30 minutes, the pH-value is adjusted to between 5.3 and 5.6 and the preparation is then filtered through a cloth. The result obtained in that way is a yellow opaque marking liquid with strong yellow fluorescence and excellent light-stability which can be used in the usual manner for the production of marker implements.

EXAMPLE 18

Marking Liquid, Fluorescing Blue

| | |
|---|---|
| Fiesta Comet Blue T-60 | 18.000 |
| Zinc chloride, water-free | 3.500 |
| 1,2-Propylene glycol | 10.000 |
| Ceteareth-20 | 2.000 |
| Preserving agent | 0.150 |
| Water, demineralised | 66.350 |

Production is effected similarly to Example 17. The result obtained is a blue marking liquid with weakly blue fluorescence and very good light-stability.

EXAMPLE 19

Marking Liquid, Fluorescing Red

| | |
|---|---|
| Fiesta Laser Red T-3 | 35.000 |
| Zinc oxide, water-free | 3.000 |
| Acetic acid (80% V/V) | 6.500 |
| 1,3-Butylene glycol | 12.500 |
| Oleth-25 | 2.000 |
| Preserving agent | 0.150 |
| Water, demineralised | 40.850 |

For production purposes the zinc oxide is dissolved in the acetic acid, wherein the acetic acid was previously diluted about 1:1 with water. Production is otherwise effected similarly to Example 17. The result obtained is a luminously red opaque marking liquid with strong red fluorescence and excellent light-stability. Besides use in marker implements this color is also well suited as an effect color in fiber-tip pens with a relatively thin applicator tip (so-called 'neon pens').

EXAMPLE 20

Marking Liquid, Fluorescing Green

| | |
|---|---|
| Fiesta Lunar Yellow GT-27 | 30.000 |
| C.I. Acid Blue 9 (No 42090) | 0.300 |
| Zinc chloride, water-free | 3.500 |
| Sorbitol (70% by weight) | 12.000 |
| Pareth-25-12 | 2.000 |
| Preserving agent | 0.150 |
| Water, demineralised | 52.050 |

Production is effected similarly to Example 17, wherein firstly the dye C.I. Acid Blue 9 which is easily soluble in water is added to the preparation prior to the addition of the zinc chloride solution. Thereafter the further procedure is as described in Example 17. The result obtained is an opaque marking liquid with marked green fluorescence and good light-stability.

EXAMPLE 21

Marking Liquid, Fluorescing Green

| | |
|---|---|
| Fiesta Lunar Yellow GT-27 | 27.500 |
| Fiesta Comet Blue T-60 | 10.500 |
| Magnesium sulfate | 4.000 |
| 1,4-Butylene glycol | 11.500 |
| Ceteareth-20 | 2.000 |
| Preserving agent | 0.150 |
| Water, demineralised | 44.350 |

Production is effected similarly to Example 17. The result obtained is an opaque green marking liquid with yellow-green fluorescence and very good light-stability.

EXAMPLE 22

Marking Liquid, Fluorescing Orange

| | |
|---|---|
| Fiesta Solar Yellow T-7 | 28.000 |
| Fiesta Laser Red GT-3 | 13.000 |
| Zinc acetate | 3.500 |
| Saccharose | 10.000 |
| Oleth-25 | 2.000 |
| Preserving agent | 0.150 |
| Water, demineralised | 43.350 |

Production is effected similarly to FIG. 17. The result obtained is an opaque dispersion with very attractive orange fluorescence and excellent light-stability. Besides use in marking implements this color is also particularly well suitable for so-called 'neon pens'.

EXAMPLE 23

Marking Liquid, Fluorescing Pink

| Fiesta Astral Pink GT-1 | 30.000 |
|---|---|
| Magnesium sulfate | 3.000 |
| Sorbitol (70% by weight) | 10.000 |
| Pareth-25-12 | 2.000 |
| Preserving agent | 0.150 |
| Water, demineralised | 54.850 |

Production is effected similarly to Example 17. The result obtained is a pale pinkly colored opaque marking liquid with bright red fluorescence and good light-stability. It is also good for so-called 'neon pens'.

Possibly still further suitable preserving agents can be added to the finished mixtures and the pH-values adjusted to the desired value by the addition of acids or lyes. It is also possible to add buffer substances for stabilising the desired pH-value.

It is recommended that the preparations be filtered, for example through a cloth, in order to separate off any solids. The inks obtained are directly suitable for filling in marker implements such as text markers or highlighters and can be subjected to processing in the usual manner. They are distinguished by low viscosity and excellent luminous power and can also be used well on fresh printing from ink jet printers or on fresh handwritten notes.

The invention claimed is:

1. A marking liquid comprising a salt solution and a polymer dispersion with particles which are colored with a marking agent, optionally further dyes and marking agents, water and optionally moisture retaining agents and additives, wherein the salt in the salt solution comprises at least one salt of a polyvalent cation and an anion of an acetate, wherein the total amount of the at least one salt of the polyvalent cation is present in a range up to the saturation limit of the solution and wherein the polymer forming the polymer particles is selected from polymers and copolymers based on acrylate.

2. The marking liquid as set forth in claim 1 comprising polymer particles based on acrylates wherein the proportion of free carboxylic acid groups is less than 10% by weight with respect to dry polymer.

3. The marking liquid as set forth in claim 1 wherein the polymer particles are polymer particles loaded with fluorescent dye.

4. The marking liquid as set forth in claim 1 wherein the polymer particles which are loaded with fluorescent dyes and daylight colors.

5. The marking liquid as set forth in claim 3 including a combination of fluorescent dyes.

6. The marking liquid as set forth in claim 1 wherein the colored polymer particles are present in the form of an aqueous dispersion.

7. The marking liquid as set forth in claim 1 wherein the salt is a salt of a di- or trivalent cation or a mixture thereof.

8. The marking liquid as set forth in claim 1 wherein the salt is a salt of magnesium, calcium, zinc, tin, cobalt, iron (II), iron (III), aluminum and/or titanium.

9. The marking liquid as set forth in claim 1 wherein the polyvalent cation is zinc.

10. The marking liquid as set forth in 1 wherein the cation is aluminum or iron (III).

11. The marking liquid as set forth in claim 1 wherein the solution comprises one salt or a mixture of salts wherein the salt or the mixture of the salts is contained in a proportion of between 0.3 and 10% by weight.

12. The marking liquid as set forth in claim 1 wherein the moisture retaining agent is selected from the group consisting of glycerine, diglycerine, triglycerine, diglycol, propylene glycol, dipropylene glycol, butylene glycols, hexylene glycols, diethylene glycol, triethylene glycol, sorbitol, manitol, xylitol, glucose, fructose, and urea.

13. The marking liquid as set forth in claim 12 wherein the moisture retaining agent is contained in a proportion of between 3 and 15% by weight with respect to the marking liquid.

14. The marking liquid as set forth in claim 1 wherein the total amount of the salts of polyvalent cations is in a range of from 0.3% by weight to the saturation limit.

15. The marking liquid as set forth in claim 1 wherein the polyvalent cation is a bi- or trivalent cation.

16. The marking liquid as set forth in claim 1 wherein the salt or the mixture of the salt is contained in proportion of between 1 and 10% by weight.

17. A marker, highlighter and/or neon pen comprising a marker liquid as set forth in claim 1.

* * * * *